United States Patent
Bahrami et al.

(10) Patent No.: US 11,750,383 B2
(45) Date of Patent: Sep. 5, 2023

(54) MULTI-LEVEL ACCESS CONTROL IN SHARING OF VEHICLE DATA WITH DEVICES

(71) Applicant: FUJITSU LIMITED, Kanagawa (JP)

(72) Inventors: Mehdi Bahrami, Santa Clara, CA (US);
Takuki Kamiya, San Jose, CA (US);
Wei-Peng Chen, Fremont, CA (US)

(73) Assignee: FUJITSU LIMITED, Kawasaki (JP)

(*) Notice: Subject to any disclaimer, the term of this patent is extended or adjusted under 35 U.S.C. 154(b) by 116 days.

(21) Appl. No.: 17/301,384

(22) Filed: Mar. 31, 2021

(65) Prior Publication Data

US 2022/0321343 A1 Oct. 6, 2022

(51) Int. Cl.
*H04L 9/30* (2006.01)
*G07C 5/00* (2006.01)
*H04W 12/08* (2021.01)
*H04L 9/08* (2006.01)
*H04L 9/40* (2022.01)

(52) U.S. Cl.
CPC ............. *H04L 9/30* (2013.01); *G07C 5/008* (2013.01); *H04L 9/088* (2013.01); *H04L 63/0428* (2013.01); *H04L 63/105* (2013.01); *H04W 12/08* (2013.01)

(58) Field of Classification Search
None
See application file for complete search history.

(56) References Cited

U.S. PATENT DOCUMENTS 10,477,395 B2   11/2019   Bahrami
10,726,642 B1*   7/2020   Goluguri .............. G06Q 20/308

OTHER PUBLICATIONS

Dawson-Haggerty, Stephen, Xiaofan Jiang, Jorge Ortiz Gilman Tolle, and David Culler. "sMAP—a Simple Measurement and Actuation Profile for Physical Information." SenSys'10, Nov. 3-5, 2010, Zurich, Switzerland. (14 pp).
https://en.wikipedia.org/wiki/Identity-based_encryption.
https://pythonhosted.org/Smap/en/2.0/index.html.
https://news.umich.edu/how-even-one-automated-connected-vehicle-can-improve-safety-and-save-energy-in-traffic/.

* cited by examiner

*Primary Examiner* — Brandon Hoffman
(74) *Attorney, Agent, or Firm* — Fujitsu Patent Center

(57) ABSTRACT

A method comprises receiving vehicle data comprising information associated with a plurality of sensors of autonomous vehicle and segmenting the received vehicle data into non-public data and public data. The method further comprises partitioning the public data into a plurality of data partitions and generating a plurality of data levels of the public data. Each data level of the plurality of data levels is generated according to an access level of a plurality of access levels and includes one or more data partitions of the plurality of data partitions in an encrypted form. The method further comprises transmitting the generated plurality of data levels to a group of electronic devices. Each electronic device of the group of electronic devices retrieves, according to one of the plurality of access levels, at least a portion of the public data from the transmitted plurality of data levels.

20 Claims, 7 Drawing Sheets

MULTI-LEVEL ACCESS CONTROL IN SHARING OF VEHICLE DATA WITH DEVICES

FIELD

The embodiments discussed in the present disclosure are related to systems and methods for implementing multi-level access control in broadcasting vehicle data with devices.

BACKGROUND

With the advent of self-driving technology, connected Internet-of-Things (IOT), and smart cities, there has been some efforts in improving public access to various kinds of information, such as related to traffic incidents, safety issues, road traffic, or vehicle/pedestrian movements. There are many sources of information in an urban environment, especially in a smart city. For instance, autonomous or self-driving vehicles, depending on the level of autonomy, may come with one or more advanced features, which then one or more sensors to assist in driving and to locate nearby objects. Such sensors generate a lot of useful information, which remains underutilized or unutilized beyond traditional needs of the autonomous vehicle.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may be provided. The method may be executed in a system. The method may comprise receiving vehicle data, including information associated with a plurality of sensors of an autonomous vehicle. The method may further comprise segmenting the received vehicle data into non-public data and public data and partitioning the public data into a plurality of data partitions. The method may further comprise generating a plurality of data levels of the public data. Each data level of the plurality of data levels may be generated according to an access level of a plurality of access levels and includes one or more data partitions of the plurality of data partitions in an encrypted form. The method may further comprise transmitting the generated plurality of data levels to a group of electronic devices. Each electronic device of the group of electronic devices retrieves, according to one of the plurality of access levels, at least a portion of the public data from the transmitted plurality of data levels.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
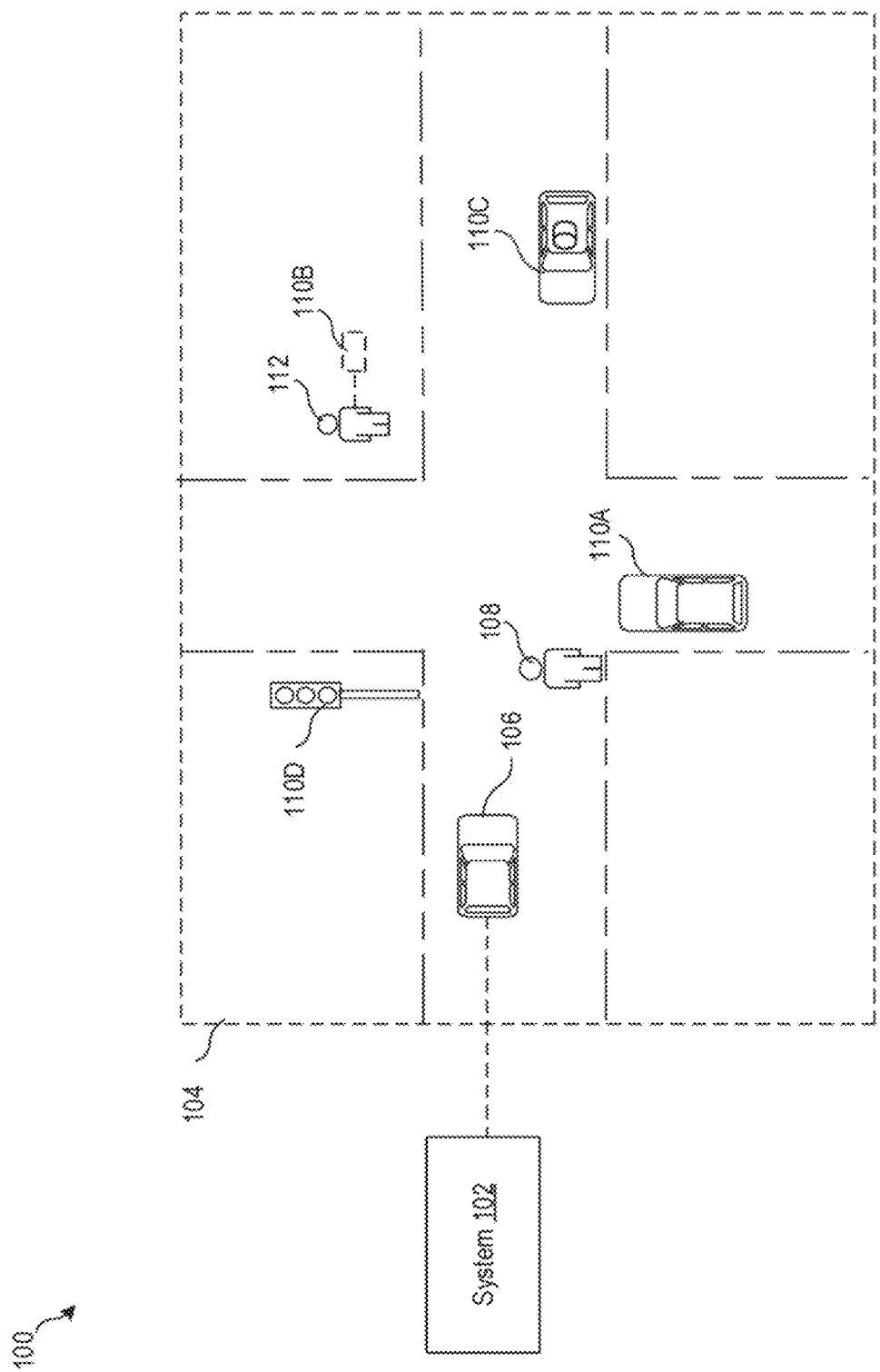
FIG. 1 is a diagram representing an example environment for broadcasting vehicle data with group of electronic devices by an autonomous vehicle.

all according to at least one embodiment described in the present disclosure.

DESCRIPTION OF EMBODIMENTS

With the advent of self-driving technology, connected Internet-of-Things (IOT), and smart cities, there has been some efforts in improving public access to various kinds of information, such as related to traffic incidents, safety issues, traffic, vehicle or pedestrian movements. There are many sources of information in an urban environment, especially in a smart city. For instance, autonomous vehicles (AV) or self-driving vehicles (SDV) may use one more sensors (e.g., cameras, LiDAR, RADAR, and the like, and any variety thereof) in order to avoid any collision and to guide the vehicle to a destination. As referred herein, an autonomous vehicle is a vehicle that includes automation at any level that is beyond level 0 (at level 0, the human driver does all the driving with the vehicle having no control over its operation).

Different AV providers have different types of sensors. Although a large amount of data is typically transferred to AV automaker and/or IT service providers of an AV, little to no information is typically shared with other vehicles and devices in the environment surrounding the AV. Some AV sensor devices may provide useful information to public and other vehicle including, non-autonomous vehicles. It would be beneficial for the public to access such information with ease. Using data from AV may be important for other devices, even for a short-time duration because other devices may use an application to analyze the data around. For example, another AV may use object detection to avoid collision, offer driving assistance, and the like. If most of the AV sensors provide some data to the public, then such data may be useful not only for the AV's own improvement, but also for other AVs/non-AVs, public infrastructure, regulation improvement, and safety of AV's passengers and pedestrians on road. Sharing the information would be beneficial to all vehicle on the road and it would provide safety and security to all vehicles on the road/street. For instance, sharing information may have a wide range of applications that includes, but not limited to. an access to a precise information from other AVs for image processing, object detection, obstacle detection, pedestrian detection, and safety improvement. Currently, each vehicle aims to protects its passengers and there isn't any information gathered and shared with other parties. In some scenarios, with regards to public access, information generated by such sensors remains mostly underutilized or unutilized beyond traditional needs of the autonomous vehicle.

The present disclosure attempts to leverage the vast amount of information (generated by sensors or by post-processing of sensor data) by making such data publicly available in an encrypted format to devices with different access levels. For instance, each sensor of AV devices may not only be used for controlling the AV, it may also provide useful information that would be in the interest for the public. Some embodiments described in the present disclosure relate to a system and a method for broadcasting vehicle data to a group of electronic devices, which may include, for example, other AVs, non-AVs, and roadside electronic devices (such as traffic lighting system, traffic cameras, police vehicles, or user's mobile devices). The system may receive the vehicle data, including information associated with a plurality of sensors of an AV. In some embodiments, the vehicle data may further include location information associated with the autonomous vehicle, vehicle-related identifiers associated with the autonomous vehicle, and user-related identifiers associated with the autonomous vehicle. The system may segment the received vehicle data into non-public data and public data. For example, the non-public data (such as private data and miscellaneous data) may be shared with an automaker or an IT service provider of the autonomous vehicle. The public data may be partitioned into a plurality of data partitions. In some embodiments, the system may de-identify the plurality of data partitions of the public data by hashing vehicle-related identifiers or user-related identifiers, included in the plurality of data partitions. The system may de-identify the plurality of data partitions to conceal sensitive information, such as a vehicle number or personally identifiable information (PII) of a user of the AV.

The system may generate a plurality of data levels of the public data. Each data level of the plurality of data levels may be generated according to an access level of a plurality of access levels and may include one or more data partitions of the plurality of data partitions in an encrypted form. The plurality of access levels may be specified based on various factors, such as, but not limited to, laws of a regions where the autonomous vehicle operates, rules made by automakers or IT providers, or an amount of information required for each device in the group of electronic devices. For example, a police vehicle may have a higher access level than a regular non-AV or other AVs. Therefore, a portion of the public data (in the form of data levels) which may be accessible to the police vehicle, may not be accessible to other devices, such as a telemetry unit of a regular vehicle.

In conventional scenarios, AV sensors only expose their information to the AV automaker and the AV's IT service provider. The present disclosure enables all AVs in an urban environment to expose their information to the public, through suitable data levels (which encrypt portions of the exposed information). By exposing the information, new avenues may open up for mobile-based applications and public information services. In some instances, the exposed (public) information may help to improve day-to-day travel of citizens in urban environments, such as smart cities.

The present disclosure may allow AVs to communicate with nearby electronic devices and with each other by broadcasting public data, which includes, for example, nearby objects, distance measurements, speeding vehicles, status of traffic signal, and positions of pedestrians. Broadcasted public data may enhance safety amongst the vehicles and pedestrians on a road. Moreover, in case of an operational fault in a vehicle, the data level retrieved by the vehicle may be utilized to safely operate the vehicle, eventually reducing a risk of a traffic incident on road. In some scenarios, the data levels may be utilized by a concerned authority or a police vehicle to identify a cause of an incident or reach to the location where the incident occurs on time.

Embodiments of the present disclosure are explained with reference to the accompanying drawings.

FIG. 1 is a diagram representing an example environment for broadcasting vehicle data with a group of electronic devices. With reference to FIG. 1, there is shown an environment 100. The environment 100 may include a system 102. There is a further shown a scene 104 of an outdoor environment, for example, an urban area with roads and city traffic. In the scene 104, there is shown an autonomous vehicle 106 on road, a pedestrian 108 at the roadside, and a group of electronic devices located at different locations around the autonomous vehicle 106. The group of electronic devices may include, for example, a first electronic device 110A, a second electronic device 110B, a third electronic device 110C and a fourth electronic device 110D. The second electronic device 110B may be associated with a person 112.

It should be noted that the number of electronic devices in FIG. 1 is merely shown as an example and should not be construed as limiting for the disclosure. The present disclosure may be applicable to a larger or smaller number of electronic devices in the outdoor environment.

The system 102 may include suitable logic, circuitry, and interfaces that may be configured to transmit (or broadcast) vehicle data into various data levels to a group of electronic devices, such as the first electronic device 110A, the second electronic device 110B, the third electronic device 110C, and the fourth electronic device 110D. Each data level may include at least one portion of the vehicle data in an encrypted form. Example implementations of the system 102 may include, but are not limited to, a server (such as a cloud server), an Electronic Control Unit (ECU) or a cluster of ECUs of a vehicle (such as the autonomous vehicle 106), a roadside unit (RSU), an edge device, an Internet of Things (JOT) device, or a network of data communication nodes (such as telecommunication devices spread across a geography).

In an embodiment, the system 102 may be implemented as part of a telematics control unit (TCU) of the autonomous vehicle 106. In another embodiment, the system 102 may be implemented as a V2X communication module (alongside the TCU) to enable vehicle to everything (V2X or cellular-V2X) communication with the group of electronic devices. In another embodiment, the system 102 may be implemented as a server that may be managed by one of an Information Technology (IT provider) associated with the autonomous vehicle 106, an auto-maker/seller or a service provider associated with the autonomous vehicle, a law enforcement agency, or an entity which may be responsible for management of public infrastructure (such as cameras, road infrastructure, and safety systems on roads).

The autonomous vehicle 106 may be one of a semi-autonomous vehicle, a fully autonomous vehicle, or a non-autonomous vehicle, in accordance with a particular level of automation, for example, as one of the different levels (e.g., 0, 1, 2, 3, 4, and 5) of driving automation defined by National Highway Traffic Safety Administration (NHTSA) or Society of Automotive Engineers (SAE). Examples of the autonomous vehicle 106 may include, but are not limited to, a two-wheeler vehicle, a three-wheeler vehicle, a four-wheeler vehicle, a hybrid vehicle, or any vehicle that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car.

The autonomous vehicle 106 may include a sensor system 106A and a self-driving system 106B, which may use the sensor system 106A to sense information associated with an environment surrounding the autonomous vehicle 106 and may control one or more operations of the autonomous vehicle 106 using the sensed information and program instructions stored on the autonomous vehicle 106 or on a server associated with the autonomous vehicle 106.

The sensor system 106A may include a plurality of sensors embedded or mounted at different locations on the autonomous vehicle 106. Examples of such sensors may include, but are not limited to, camera (such as a front camera, a 360 degrees camera, a rear camera, side door cameras, or cameras facing passenger or rear seating compartments), LiDAR (Light Detection and Ranging), RADAR, speed sensors, depth sensors, impact or collision sensors, ambient sensors, charging sensors, and other types of sensors. The self-driving system 106B may be a computer, which processes the sensed information (acquired from the plurality of sensors and/or a post-processing system (such as a server) which generates inferences or insights from the sensed information). Based on processing of the sensed information (part of the vehicle data), the self-driving system 106B takes driving decisions and/or controls one or more operations of the autonomous vehicle 106.

It should be noted here that the autonomous vehicle 106 in FIG. 1 is shown as a four-wheeler car, which is merely an example and should not be construed as limiting for the disclosure. The present disclosure may be applicable to other types of vehicles, for example, a self-driving two-wheeler (e.g., a motorbike), a self-driving truck with more than four wheels, or a manned or unmanned aerial vehicle (permitted to fly within a geo-fence). The description of other types of the autonomous vehicle 106 has been omitted from the disclosure for the sake of brevity.

Each electronic device in the group of electronic devices (such as the electronic devices 108A-108D) may include suitable logic, circuitry, and interfaces that may be configured to retrieve at least a portion of the public data from data levels transmitted by the system 102. The portion of the public data may be retrieved according to one of the plurality of access levels (for example, three access levels). The group of electronic devices may be categorized based on the plurality of access levels and may be associated with one of, but not limited to, an Information Technology (IT) service provider for the autonomous vehicle 106, an automaker of the autonomous vehicle 106, an owner or a user of the autonomous vehicle 106, a vehicle different from the autonomous vehicle 106, a government or law enforcement agency, a public transport infrastructure, or a data aggregator.

In some embodiments, the group of electronic devices may be installed as part of a public or private infrastructure in an urban space (such as a smart city). Examples of the group of electronic devices, as part of the public or private infrastructure may include, but are not limited to, traffic lights, a road toll collection device, traffic cameras, dash cameras of vehicles, roadside units, surveillance drones or robots, digital signages, mobile devices carried by pedestrians, edge devices, telecom devices, vehicle charging stations, cloud servers, a mobile digital terminal in a law enforcement vehicle, an electronic control unit (ECU) of the vehicle which is within a threshold distance from the autonomous vehicle 106, and/or a combination thereof.

As shown, for example, the first electronic device 110A is a component (for example, an ECU of the first vehicle) of a first vehicle, the second electronic device 110B is a mobile device associated with the person 112, the third electronic device 110C is a component of the law enforcement vehicle (such as a police vehicle), and the fourth electronic device 110D is a traffic lighting system.

In operation, the system 102 may receive the vehicle data which may include information associated with the plurality of sensors (of the sensor system 106A) of the autonomous vehicle 106. For example, the vehicle data may include information, for example, raw sensor data or results (drawn from the raw sensor data) such as a location of the pedestrian 108, a signal status of the fourth electronic device 110D, and a speed of the first vehicle which includes the first electronic device 110A. Such information may be associated with objects or devices surrounding the autonomous vehicle 106.

In an embodiment, the received vehicle data may also include location information associated with the autonomous vehicle 106, vehicle-related identifiers associated with the autonomous vehicle 106, and user-related identifiers associated with the autonomous vehicle 106. The location information may include a current geographical location of the autonomous vehicle 106. The vehicle-related identifiers (such as a chassis number or a vehicle license or registration number) and the user-related identifiers (such as a driving license number or user bio-data) may be received (or extracted) from a database which may be locally stored on the autonomous vehicle 106 or may be stored on a server associated with the autonomous vehicle 106. Details of the reception of the vehicle data are further provided for example, in FIG. 4.

The system 102 may segment the received vehicle data into non-public data (such as private data and miscellaneous/ unclassified data) and public data. In accordance with an embodiment, the received vehicle data may include a plurality of objects, each of which may be formatted as a key-value pair. For example, the plurality of objects may be represented as Binary JavaScript Object Notation (B SON) objects.

The system 102 may segment the received vehicle data based on a public data schema and a private data schema. In some embodiments, the segmentation may include selection of an object of the plurality of objects. The selected object may be searched in each of the private data schema and the public data schema. The system 102 may include the searched object in the public data based on a determination that the searched object is found (based on the search) in the public data schema. Details of the segmentation of the received vehicle data are further provided, for example, in FIG. 5.

The system 102 may partition the public data into a plurality of data partitions. Details of the partitioning of the public data are further provided, for example, in FIG. 5. In accordance with an embodiment, the system 102 may de-identify the plurality of data partitions of the public data by hashing vehicle-related identifiers or user-related identifiers included in the plurality of data partitions. The de-identification may be performed to remove any critical or sensitive information (for example, a vehicle number of a nearby vehicle included in the public data). Thereafter, the system 102 may generate a plurality of data levels of the public data. Each data level of the plurality of data levels may be generated according to an access level (of a plurality of access levels) and may include one or more data partitions of the plurality of data partitions in an encrypted form.

For example, three data levels, i.e. a first data level (L1), a second data level (L2), and a third data level (L3) may be generated from three data partitions (P1, P2, and P3). Each data partition may include datapoints or objects (for example, key-value pairs) which can be collectively shared (wirelessly) with electronic devices with a particular access level. By way of example, and not limitation, if there is a road accident, pedestrians with mobile devices (e.g., having L1 access) may be informed about the occurrence of the accident (P1). The traffic system (e.g., having L2 access) may need to be updated about the occurrence of the accident (P1) and location and data/time information (P2) associated with the accident. The traffic system may require such information to stop or reroute traffic through another route. The law enforcement agency (e.g., with L3 access) may need to be updated about the occurrence of the accident (e.g., P1), the time and place of the accident (P2), other information (P3), such as a type of accident, a severity of accident, and details of people who met the accident.

In accordance with an embodiment, the system 102 may generate a first data level of the plurality of data levels by encrypting a first data segment. The first data segment may include a first data partition of the plurality of data partitions and a first public key to validate the first data partition. By way of example, and not limitation, the encryption of the first data segment and generation of the public key may be performed using an asymmetric encryption algorithm, such as, but not limited to, RSA (Rivest-Shamir-Adleman), Diffie-Hellman key exchange protocol. DSS (Digital Signature Standard), ElGamal, and Elliptic-curve cryptography. The first data level may correspond to a first access level of the plurality of access levels. In some embodiments, a first private key corresponding to the first public key may be stored on one or more electronic devices (from among the group of electronic devices), which may be authorized to receive the first data level.

In accordance with an embodiment, the system 102 may further generate a second data level of the plurality of data levels by encrypting a second data segment. The second data segment may include a second data partition of the plurality of data partitions, the encrypted first data segment, and a second public key to validate the second data partition. Similar to the encryption of the first data segment, the second data segment may also be encrypted using the asymmetric encryption algorithm. The second data level may correspond to a second access level of the plurality of access levels. The first private key (corresponding to the first public key for the encrypted first data segment) and a second private key corresponding to the second public key may be stored on the electronic devices, which may be authorized to receive the second data level.

In accordance with an embodiment, the system 102 may further generate a third data level of the plurality of data levels by encrypting a third data segment. The third data segment may include a third data partition of the plurality of data partitions, the encrypted second data segment, and a third public key to validate the third data partition. Similar to the encryption of the first data segment, the third data segment may also be encrypted using the asymmetric encryption algorithm. The third data level may correspond to a third access level of the plurality of access levels. The first private key, the second private key, and a third private key (corresponding to the first public key, the second public key and the third public key, respectively) may be stored on the electronic devices (of the group of electronic devices) which may be authorized to receive the third data level. Details of the generation of the plurality of data levels are further provided for example, in FIG. 5.

The system 102 may be configured to transmit the generated plurality of data levels to the group of electronic devices, such as the first electronic device 110A, the second electronic device 110B, the third electronic device 110C, and the fourth electronic device 110D. Each electronic device of the group of electronic devices may retrieve, according to one of the plurality of access levels, at least a portion of the public data from the transmitted plurality of data levels.

In some embodiments, the system 102 of the autonomous vehicle 106 may be configured to transmit the plurality of data levels to the group of electronic devices over a V2X (Vehicle-to-Everything) communication channel. The V2X communication between the autonomous vehicle 106 and the group of electronic devices may be via one or more communication protocols, such as a Cellular-V2X communication protocol or a Dedicated Short Range Communication (DSRC) protocol (in accordance with Institute of Electrical and Electronics Engineers (IEEE) 802.11p standard). The C-V2X protocol may be based on a 4th generation Long Term Evolution (4G LTE) standard or 5th generation (5G) mm—wave standard, for example. Examples of the V2X communication between the autonomous vehicle 106 and the group of electronic devices may include, but are not limited to, vehicle-to-infrastructure (V2I) communication, vehicle-to-network (V2N) communication, vehicle-to-vehicle (V2V) communication, vehicle-to-pedestrian (V2 P) communication, vehicle-to-device (V2D) communication, or vehicle-to-grid (V2 G) communication. Details of the transmission of the plurality of data levels are further provided for example, in FIG. 6.

In accordance with an embodiment, the system 102 may receive a validation request from the first electronic device 110A of the group of electronic devices. The validation request may include the portion of the public data which may be retrieved by the first electronic device 110A (from a received data level). The system 102 may match the portion of the public data that may be in the validation request with an archived copy of a corresponding data partition of the plurality of data partitions. Based on the match, the system 102 may validate the portion of the public data in the validation request. Details of the validation of the public data are further provided for example, in FIG. 6.

Modifications, additions, or omissions may be made to FIG. 1 without departing from the scope of the present disclosure. For example, the environment 100 may include more or fewer elements than those illustrated and described in the present disclosure. For instance, in some embodiments, the functionality of the system 102 may be incorporated into the autonomous vehicle 106, without a deviation from the scope of the disclosure.

Figure 2:
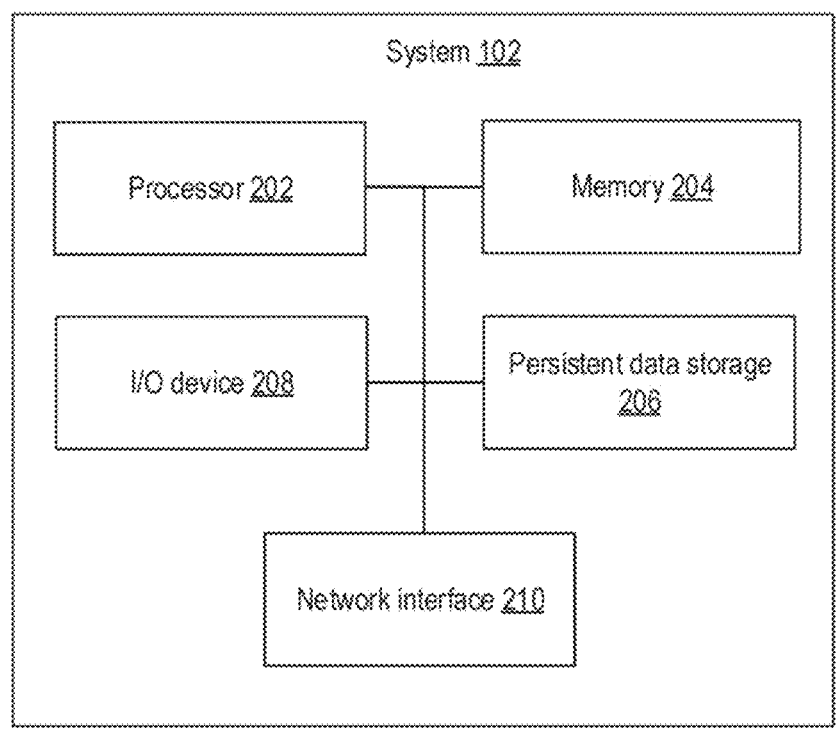
FIG. 2 is a block diagram that illustrates an exemplary system for broadcasting vehicle data with group of electronic devices.

FIG. 2 is a block diagram that illustrates an exemplary system for broadcasting vehicle data with group of electronic devices, according to at least one embodiment described in the present disclosure. FIG. 2 is explained in conjunction with elements from FIG. 1. With reference to FIG. 2, there is shown a block diagram 200 of the system 102. The system 102 may include a processor 202, a memory 204, a persistent data storage 206, an input/output (I/O) device 208 and a network interface 210.

The processor 202 may comprise suitable logic, circuitry, and/or interfaces that may be configured to execute program instructions associated with different operations to be executed by the system 102. For example, some of the operations may include reception of the vehicle data, segmentation of the received vehicle data into the non-public data and the public data, partitioning the public data into the plurality of data partitions. The operations may further include generation of the plurality of data levels of the public data and transmission of the plurality of data levels to the group of electronic devices.

The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into the memory 204, the processor 202 may execute the program instructions. Some of the examples of the processor 202 may be a central processing unit (CPU), a graphics processing unit (GPU), a Reduced Instruction Set Computer (RISC) processor, an application-specific integrated circuit (ASIC) processor, a complex instruction set computer (CISC) processor, a co-processor, and/or a combination thereof.

The memory 204 may comprise suitable logic, circuitry, and/or interfaces that may be configured to store program instructions executable by the processor 202. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or special-purpose computer, such as the processor 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may comprise suitable logic, circuitry, and/or interfaces that may be configured to store program instructions executable by the processor 202, operating systems, and/or application-specific information, such as logs and application-specific databases. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

In some embodiments, either of the memory 204, the persistent data storage 206, or combination may store the vehicle data, the plurality of data partitions and the plurality of data levels. The processor 202 may fetch the vehicle data (i.e. to perform different operations of the disclosed system 102) from the memory 204, the persistent data storage 206 or combination. In some embodiments, either of the memory 204, the persistent data storage 206, or combination may store the plurality of access levels and the plurality of objects of the received vehicle data.

The I/O device 208 may include suitable logic, circuitry, interfaces, and/or code that may be configured to receive a user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display and a speaker.

The network interface 210 may comprise suitable logic, circuitry, interfaces, and/or code that may be configured to establish a communication (for example, for the V2X communication described in FIG. 1) between the system 102 and the group of electronic devices, such as the first electronic device 110A, the second electronic device 110B, the third electronic device 110C and the fourth electronic device 110D via a communication network. The network interface 210 may be implemented by use of various known technologies to support wired or wireless communication of the system 102 via the communication network. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity information module (SIM) card, and/or a local buffer.

The network interface 210 may enable communication via wireless communication with networks, such as the Internet, an Intranet and/or a wireless network, such as a cellular network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the example system 102 without departing from the scope of the present disclosure. For example, in some embodiments, the example system 102 may include any number of other components that may not be explicitly illustrated or described for the sake of brevity.

Figure 3:
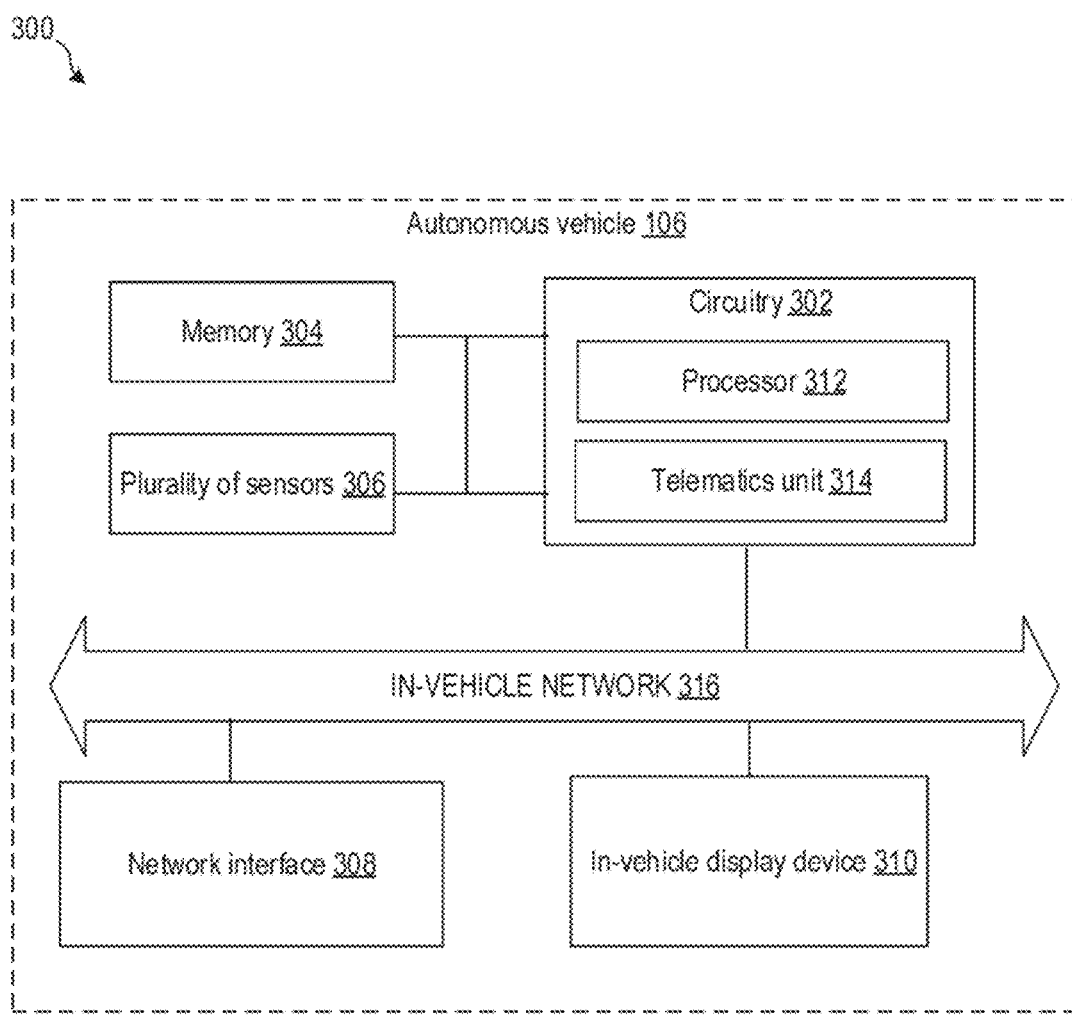
FIG. 3 is a block diagram of an exemplary autonomous vehicle for broadcasting vehicle data with a group of electronic devices.

FIG. 3 is a block diagram of an exemplary autonomous vehicle for broadcasting vehicle data to a group of electronic devices, according to at least one embodiment described in the present disclosure. FIG. 3 is explained in conjunction with elements from FIG. 1 and FIG. 2. With reference to FIG. 3, there is shown a block diagram 300 of the autonomous vehicle 106. The block diagram 300 of the autonomous vehicle 106 may include circuitry 302. The circuitry 302 may be implemented as part of an electronic control unit (ECU), which may include at least a microprocessor and/or a memory. The autonomous vehicle 106 may further include a memory 304, a plurality of sensors 306, a network interface 308, and an in-vehicle display device 310.

The circuitry 302 may further include a processor 312 and a telematics unit 314. In an exemplary embodiment, the processor 312 may be same as the processor 202 of FIG. 2. The operations performed by the processor 202 as explained in FIG. 2 may also be performed by the processor 312 of the autonomous vehicle 106.

The autonomous vehicle 106 may further include an in-vehicle network 316 to facilitate communication between internal components of the autonomous vehicle 106. A person of ordinary skilled in the art will understand that the autonomous vehicle 106 may also include other suitable components or systems, in addition to the components or systems illustrated herein to describe and explain the function and operation of the present disclosure. A description of such components or systems is omitted herein for the sake of brevity.

The circuitry 302 may include suitable logic, circuitry, and interfaces that may be configured to execute program instructions associated with different operations to be executed by the autonomous vehicle 106 or the system 102 of the autonomous vehicle 106. The circuitry 302 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 302 may be implemented based on a number of processor technologies known in the art. Examples of implementations of the circuitry 302 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 304 may include suitable logic, circuitry, interfaces, and/or code that may be configured to store the program instructions executable by the circuitry 302. In certain embodiments, the memory 304 may be configured to store operating systems and associated application-specific information. The functions of the memory 304 may be same as the functions of the memory 204 described, for example, in FIG. 2. Therefore, further description of the memory 304 is omitted from the disclosure for the sake of brevity.

The plurality of sensors 306 may include suitable logic, circuitry, and interfaces that may be configured to generate a plurality of signals based on sensing the environment surrounding the autonomous vehicle 106. For instance, such signals may include detection of one or more objects in the surrounding of the autonomous vehicle 106 and a status of the traffic lighting system (such as the fourth electronic device 110D). The plurality of sensors 306 may further generate a plurality of signals based on the current geographical location of the autonomous vehicle 106. In some embodiments, the system 102 may generate the vehicle data based on the plurality of signals received from the plurality of sensors 306. In another embodiment, the plurality of signals may be transmitted to a server associated with the automaker of the autonomous vehicle 106. The plurality of signals may be processed on the server to generate a portion of the vehicle data that include post-processed information (such as decisions or inferences).

In some embodiments, the server may implement a machine learning based model to process the plurality of signals. The system 102 may receive the vehicle data from the server associated with the automaker of the autonomous vehicle 106. Examples of the plurality of sensors 306 may include but are not limited to, an image sensor, a light detection and ranging (LiDAR) sensor, an audio sensor, a radio detection and ranging (RADAR) sensor, a location sensor, an ultrasonic sensor, or a microphone. The plurality of sensors 306 may be located at different positions of the autonomous vehicle 106.

In an exemplary scenario, the RADAR sensor may be positioned towards, for example, at a front end of the autonomous vehicle 106. Another RADAR sensor may further be positioned towards a rear end of the autonomous vehicle 106. The RADAR sensors may be utilized to detect objects, such as infrastructure, the pedestrian 108 and other vehicles, such as the third electronic device 110C around the autonomous vehicle 106. Further, the LiDAR sensor may be positioned at a roof of the autonomous vehicle 106. The LiDAR sensor may be configured to measure a distance to objects, such as with the pedestrian 108 from the autonomous vehicle 106 by illuminating of the pedestrian 108 with light (e.g. modulated laser light) and by measuring return times and wavelengths of the reflected light (from the pedestrian 108). The image sensor (such as in the form of a camera), may be positioned at a front bumper, a rear bumper, or a roof of the autonomous vehicle 106. The image sensor may generate one or more images of objects in the surrounding environment. Similarly, other sensors may perform respective functions for capturing the plurality of signals, for generation of the vehicle data.

The detailed implementation of the plurality of sensors 306 in the autonomous vehicle 106 may be known to one skilled in the art, and therefore, a detailed implementation of the plurality of sensors 306 has been omitted from the disclosure for the sake of brevity.

The network interface 308 may include suitable logic, circuitry, interfaces, and/or code that may enable communication between the autonomous vehicle 106 and each of the group of electronic devices, via a wireless communication network. The network interface 308 may implement known technologies to support wired and/or wireless communication. The network interface 308 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The functions of the network interface 308 may be same as the functions of the network interface 210 described, for example, in FIG. 2. Therefore, further description of the network interface 308 is omitted from the disclosure for the sake of brevity.

The in-vehicle display device 310 may include suitable logic, circuitry, interfaces, and/or code that may be configured to render various types of information and/or viewable content via a user interface (UI) of the autonomous vehicle 106. The UI may be a customizable or a non-customizable Graphical UI that may display various types of information related to the autonomous vehicle 106. Examples of the in-vehicle display device 310 may include, but are not limited to, a display of the infotainment head unit, a projection-based display, a see-through display, and/or an electro-chromic display. In an embodiment, the in-vehicle display device 310 may be implemented as one of, but not limited to, Multi-Information Display (MID), an automotive Head-Up Display (HUD), or an instrument cluster.

The processor 312 may include suitable logic, circuitry, and interfaces that may be configured to execute a set of instructions stored in the memory 304. The processor 312 may be configured to execute program instructions associated with different operations to be executed by the autonomous vehicle 106. The functions of the processor 312 may be same as the functions of the processor 202 described, for example, in FIG. 2. Therefore, further description of the processor 312 is omitted from the disclosure for the sake of brevity.

The telematics unit 314 may include suitable logic, circuitry, and/or interfaces that may be configured to control tracking, diagnostics and communication of the autonomous vehicle 106 with the group of electronic devices. The telematic unit 314 may include a global positioning system (GPS) unit that may provide a location of the autonomous vehicle 106. The telematics unit 314 may further include one or more interfaces for communication, for example, Global System for Mobile Communications (GSM) interface, General Packet Radio Service (GPRS) interface, Long-Term Evolution (LTE) interface, and so forth. The telematics unit 314 may further include one or more processing units, for example, a microcontroller, a microprocessor, a field programmable gate array (FPGA), and the like.

Figure 4:
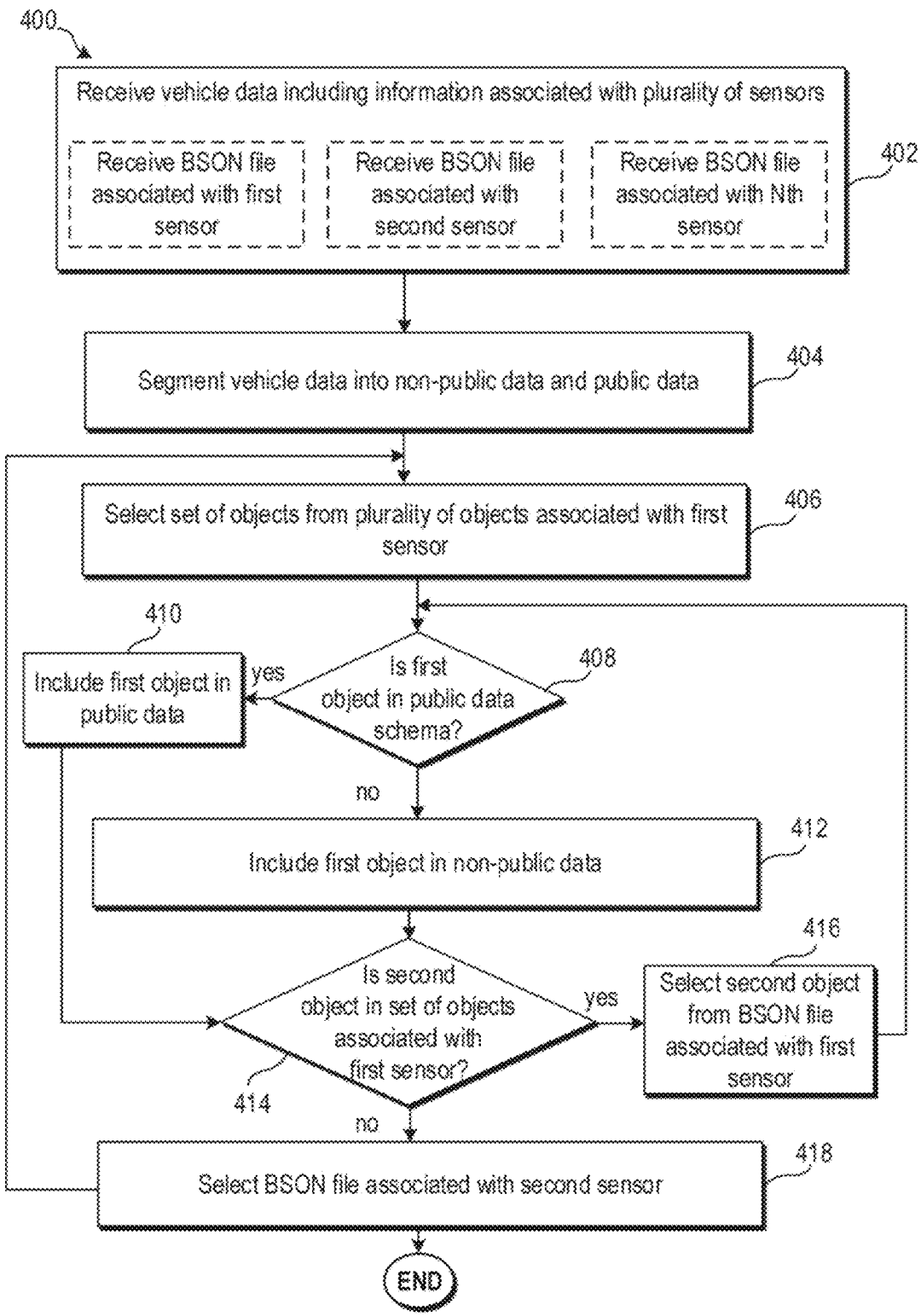
FIG. 4 illustrates a flowchart of an example method related to segmenting of vehicle data into public data and non-public data.

FIG. 4 illustrates a flowchart of an example method related to segmenting of vehicle data into public data and non-public data, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example system 102 of FIG. 1 or the processor 202 of FIG. 2. Although illustrated with discrete blocks, the steps and operations associated with one or more of the blocks of the method may be divided into additional blocks, combined into fewer blocks, or eliminated, depending on the particular implementation.

At 402, the vehicle data, including information associated with the plurality of sensors 306 of the autonomous vehicle 106 may be received. In accordance with an embodiment, the processor 202 may be configured to receive the vehicle data, including the information associated with the plurality of sensors 306 of the autonomous vehicle 106. In an embodiment, the vehicle data may be received from a server associated with a service provider (such as an IT service provider) or a manufacturer (such as the automaker) of the autonomous vehicle 106.

In some embodiments, the information associated with the plurality of sensors 306 may include sensor measurements (such as signals recorded by the plurality of sensors 306), and decision and inference information associated with a post-processing of the sensor measurements on the autonomous vehicle 106 or on one or more electronic devices (such as a server or an edge device), which may be separate from the autonomous vehicle 106 and may be managed by one or more service providers associated with the autonomous vehicle 106.

The sensor measurements may include, for example, LiDAR data, camera images, RADAR data, and other sensor data. For instance, the sensor measurements may include point cloud data generated by the LiDAR sensor for determination of a distance between the pedestrian 108 and the autonomous vehicle 106. The generated point cloud data may be post-processed (such as by the processor 202 or on the server/edge device) to determine the distance between the pedestrian 108 or other objects in the surrounding environment and the autonomous vehicle 106. The distance may be included in the decision and inference information, for example. Other examples of the decision and inference information may include, but are not limited to, traffic sign, traffic density, accident or near-miss from an accident, a traffic light color, a number of pedestrians, a scene complexity (in terms of roads, turns, elevations, intersections, and a number of people or vehicles on the road), a distance between pedestrians, vehicles, or other objects on road, or a required speed or acceleration on a section of road.

In accordance with an embodiment, the received vehicle data may further include location information associated with the autonomous vehicle 106, vehicle-related identifiers associated with the autonomous vehicle 106, and user-related identifiers associated with the autonomous vehicle 106. For example, the location information may include a current geographical location of the autonomous vehicle 106. The vehicle-related identifiers may include, for example, a license plate number of the autonomous vehicle 106, registration information of the autonomous vehicle 106, insurance information, and a model number of the autonomous vehicle 106. The user-related identifiers may include, for example, personal information, such as a name, age and occupation detail of an owner of the autonomous vehicle 106, contact information of the owner of the autonomous vehicle 106, and an address of the owner of the autonomous vehicle 106.

At 404, the received vehicle data may be segmented into non-public data and public data, as described herein. The received vehicle data may include a plurality of objects. Each object may represent a datapoint (for example, an ID, a file location, an inference, and the like) of the received vehicle data and may be represented in a format, such as a key-value pair.

At 406, from the plurality of objects, a set of objects associated with a first sensor of the plurality of sensors 306 may be selected. The first sensor may be, for example, an image sensor installed in the autonomous vehicle 106. In accordance with an embodiment, the processor 202 may be configured to select the set of objects from the plurality of objects included in the received vehicle data.

In some embodiments, information associated with each sensor of the plurality of sensors 306 may be processed to generate a binary java script object notation (BSON) file. In the BSON file, such information may be included in the form of the set of objects. For example, objects associated with the image sensor in the BSON file may be represented as {"ID":1, "video": Binary ("b1234224AAF43F"), GPS: {"att":123,"lat":456}}. The objects may include an identifier, video information (associated with a video acquired by the image sensor), time, or a geographical location where the video is recorded.

In accordance with an embodiment, each object may be formatted as a key-value pair. The key-value pair may include two related data elements, i.e., the key and the value. The key in the key-value pair may define entries, such as variable names or parameter names. In previous example, the keys may be "ID", "video", and "GPS location". For each key, a value may be added next to the corresponding key. For example, the values corresponding to keys "ID", "video", and "GPS location" may be "1", Binary ("b1234224AAF43F"), and ""att":123, "lat":456", respectively.

At 406, an object (such as a first object) from the selected set of objects may be further selected. In accordance with an embodiment, the processor 202 may be configured to select the first object of the selected set of objects (which is part of the plurality of objects included in the received vehicle data).

At 408, it may be determined whether the selected object is in the public data schema. In case the selected object is in the public data schema, control may pass to 410. Otherwise, control may pass to 412. In accordance with an embodiment, for such determination, the processor 202 may be configured to search the selected first object in each of the private data schema and the public data schema. The private data schema and the public data schema may define a set of rules applicable to the plurality of objects. The set of rules may be described in a format, such as, but not limited to, Extensible Markup Language (XML), JavaScript Object Notation (JSON), or YAML (YAML Ain't Markup Language). In an embodiment, the private data schema may specify which objects or nested objects (from the selected set of objects) should be (or should not be) elected as part of the private data or the non-public data. Similarly, the public data schema may specify which objects or nested objects (from the selected set of objects) should be elected as part of the public data.

The non-public data (includes private data and miscellaneous data (if any)) may include sensitive or critical information, for example, faces of pedestrians in images, a video feed of the surrounding environment, personally identifiable information (PII), vehicle registration information, and the like. Such information may be restricted to devices which may be authorized for a particular access level. In an embodiment, the private data schema may include logical constraints or tags/keys to identify one or more objects (of the selected set of objects) as part of the private or non-public data. An example of the private data schema is provided, as follows:

```
'private':
    'video_data':
        'select':
            sensors.all_videos.video.filename
            sensors.all_videos.video.timestamp
            sensors.all_videos.video.totalframe
            sensors.all_videos.video.source
    'lidar':
        'select':
            sensors.all_lidars.object_distance
            sensors.all_lidars.object_type
            sensors.all_lidars.timestamp
```

The public data may include information which can be publicly transmitted or broadcasted (with securely) to a group of electronic devices (having a required authorization or which satisfy criteria (such as a location-based criteria)). The public data schema may also include logical constraints to identify one or more objects (of the selected set of objects) as part of the public data.

The private data schema and the public data schema may be specified, for example, by the automaker of the autonomous vehicle 106, the service provider (such as the IT provider) of the autonomous vehicle 106, or by an authority (such as a law enforcement agency) to differentiate the public data from the non-public data (such as the private data). In accordance with an embodiment, the private data schema and the public data schema may be defined in accordance with laws (for example, General Data Protection Regulation (GDPR) policy) or guidelines of a regulatory body. Additionally, or alternatively, the private data schema and the public data schema may be defined based on public and private policies of entities, such as automakers, IT service providers, users or vehicle owners, governments, or citizens living within a geographical region. Additionally, or alternatively, the private data schema and the public data schema may be defined based on the policies, laws, or regulations of the geographical location where the autonomous vehicle 106 may operate.

In an exemplary scenario, the private data schema may include one or more objects associated with the image sensor. As an example, the image sensor may capture an accident which may have occurred within the threshold distance of the autonomous vehicle 106. The one or more objects may include the video of the captured accident, a filename of the video data, a timestamp of the video data, a total number of frames of the video data and a source of the video data. As another example, the private data schema may include one or more objects associated with the LiDAR sensor. The one or more objects may include the point cloud data of the surroundings of the autonomous vehicle 106, a distance between the autonomous vehicle 106 and the pedestrian 108, and a timestamp of the LiDAR data.

In another exemplary scenario, the public data schema may include one or more objects associated with the image sensor. For example, the one or more objects may include the location information of a site of the captured incident but may not include an actual footage of the captured accident. The one or more objects in the public data schema may further include a model number of a vehicle and a number of casualties involved in the accident.

At 410, the first object (selected at 406) of the BSON file may be included in the public data, based on a determination that the searched first object is found in the public data schema. In accordance with an embodiment, the processor 202 may include the selected object (such as the first object) in the public data. By way of example, and not limitation, the first object may include location information of the site of the accident recorded by the autonomous vehicle 106. Based on the searching the first object in the public data schema, it may be determined that the location information should be included in the public data. Accordingly, the first object may be included in the public data.

At 412, the first object of the BSON file may be included in the non-public data, based on a determination that the first object is found in the private data schema. In accordance with an embodiment, the processor 202 may include the selected object first object in the non-public data. By way of example, and not limitation, the first object may include a link to a video of the accident recorded by the autonomous vehicle 106. Based on searching the first object in the private data schema, it may be determined that the link to the video should be included in the non-public data or private data. Accordingly, the first object may be included in the non-public data.

In some embodiments, the first object may only be searched in one of the private data schema or the public data schema. For example, the first object may be searched in the private data schema. The first object may be included in the non-public data, if the first object is found to be present in the private data schema. Whereas, if the object is found to be absent in the private data schema, the first object may be included in the public data.

At 414, it may be determined whether there is a second object in the selected set of objects (as part of the BSON file) associated with the first sensor. In accordance with an embodiment, the processor 202 may be configured to determine whether there is a second object in the selected set of objects. In case there is a second object in the selected set of objects, control may pass to 416. Otherwise, control may pass to 416.

At 416, the second object may be selected from the BSON file associated with the first sensor, based on the determination that the second object is present in the BSON file. In accordance with an embodiment, the processor 202 may be configured to select the second object from the BSON file. After the selection, the processor 202 may iteratively perform operations from 408 to 414 for the selected second object.

At 418, the BSON file associated with a second sensor of the plurality of sensors 306 may be selected. In accordance with an embodiment, the processor 202 may be configured to select the BSON file associated with the second sensor of the plurality of sensors 306. After selection of the BSON file associated with the second sensor, the processor 202 may iteratively perform operations from 406 till 414. In an embodiment, the processor 202 may transmit the public data as well as the non-public data to a server associated with the automaker and/or the service provider of the autonomous vehicle 106.

Control passes to end. Although the flowchart 400 is illustrated as discrete operations, such as 402, 404, 406, 408, 410, 412, 414, 416 and 418. However, in certain embodiments, such discrete operations may be further divided into additional operations, combined into fewer operations, or eliminated, depending on the particular implementation without detracting from the essence of the disclosed embodiments.

Figure 5:
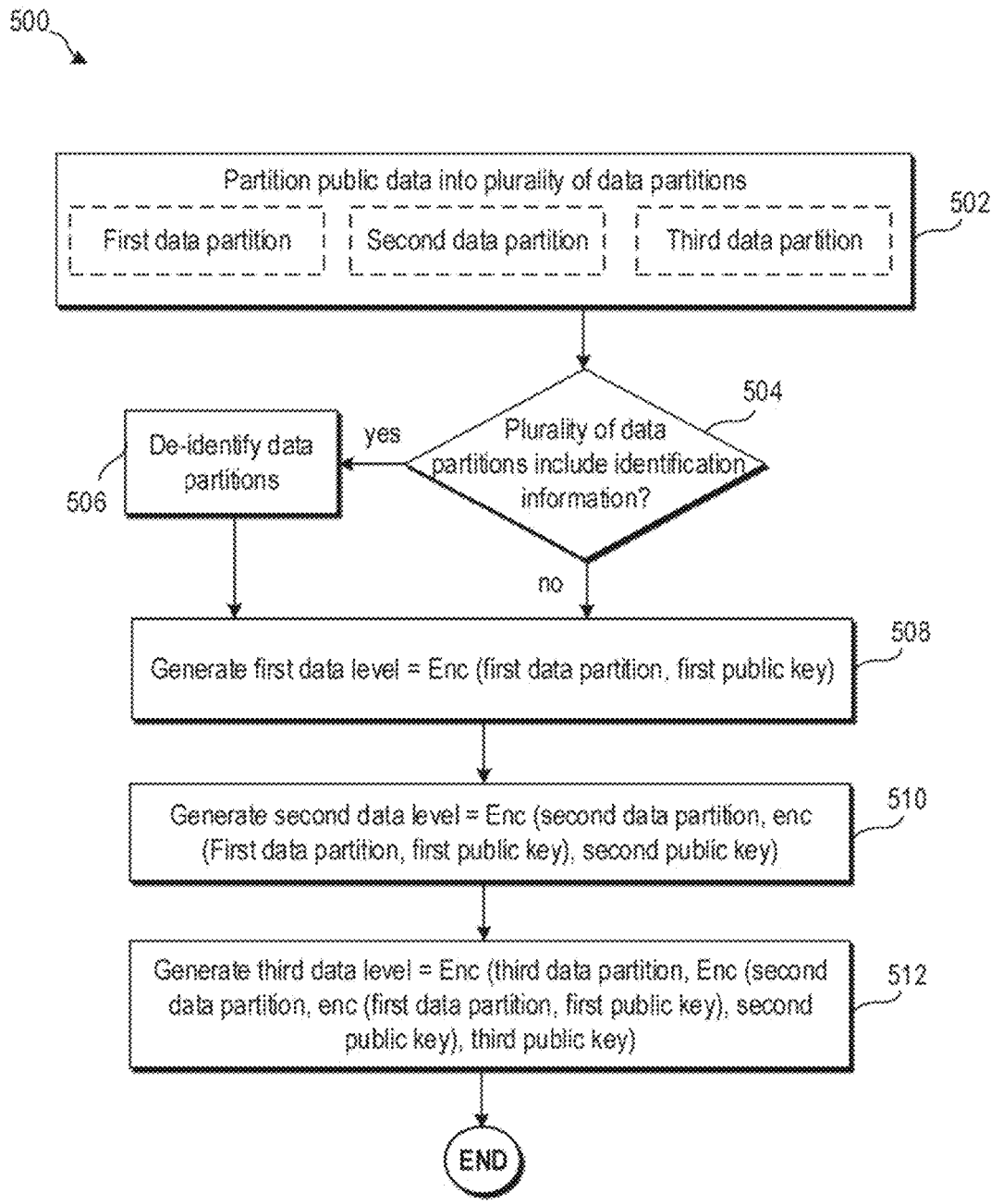
FIG. 5 illustrates a flowchart of an example method related to generation of a plurality of data levels of public data.

FIG. 5 illustrates a flowchart of an example method related to generation of plurality of data levels of public data, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the example system 102 of FIG. 1 or the processor 202 of FIG. 2. Although illustrated with discrete blocks, the steps and operations associated with one or more of the blocks of the method may be divided into additional blocks, combined into fewer blocks, or eliminated, depending on the particular implementation.

At 502, the public data (obtained in FIG. 4) may be partitioned into the plurality of data partitions. In accordance with an embodiment, the processor 202 may be configured to partition the public data into the plurality of data partitions. In some embodiments, the processor 202 may partition the public data into a first data partition (P1), a second data partition (P2) and a third data partition (P3). In other embodiments, the processor 202 may partition the public data into more or less than three data partitions.

In accordance with an embodiment, the processor 202 may partition the public data based on a number of data levels or a number of access levels for the public data. In another embodiment, the partitioning may be performed based on metadata that specifies a data portion (i.e. objects) to be included from the public data in each data partition. For example, there may be three access levels for the group of electronic devices. Each electronic device may be configured to access a portion of the public data according to an access level assigned to the respective electronic device. The access level may be assigned to each electronic device based on a set of rules. Such rules may be set based on laws of a region where the electronic devices may operate or may be set by an entity, such as a regulatory body, an IT service provider for the autonomous vehicle 106, the automaker(s), or the local government. Based on three access levels, the public data may be partitioned into three partitions (P1, P2, and P3). An example list of electronic devices with corresponding access levels and accessible data partitions is provided in Table 1, as follows:

TABLE 1

Example list of electronic devices with corresponding access levels and accessible data partitions

| Devices | Access Level | Partitions |
|---|---|---|
| Police vehicle, servers of IT service provider, automaker, Police body cameras, and Police Dash Cameras | Third Access Level | P1, P2, P3 |
| Traffic lighting system, Roadside units, Digital toll collection system, and CCTV cameras | Second Access Level | P1, P2 |
| Mobile Devices, webserver (which hosts a publicly accessible website), and digital signages on roads or public places | First Access Level | P1 |

At 504, it may be determined whether the plurality of data partitions includes identification information. In accordance with an embodiment, the processor 202 may determine whether the identification information is present in the generated plurality of data partitions. By way of example, and not limitation, the identification information may include, for example, the vehicle-related identifiers (such as license plate numbers of vehicles (such as the vehicle that includes the first electronic device 110A and the autonomous vehicle 106) and/or or user-related identifiers (such as PII of the owner/passenger of the autonomous vehicle 106). In case the plurality of data partitions includes the identification information, control may pass to 506. Otherwise, control may pass to 510.

At 506, based on the determination that the identification information is present in the generated plurality of data partitions, the plurality of data partitions may be de-identified. In accordance with an embodiment, the processor 202 may de-identify (or anonymize) the plurality of data partitions. The plurality of data partitions may be de-identified by hashing the vehicle-related identifiers or the user-related identifiers, included in the plurality of data partitions. For example, a vehicle-related identifier, such as the license plate number of the autonomous vehicle 106 and a user-related identifier, such as name of the owner of the autonomous vehicle 106 may be hashed. The hashing of the vehicle-related identifiers or the user-related identifiers may generate a hash identifier (ID).

In an embodiment, the de-identification of the plurality of data partitions may be based on a law (such as GDPR) or a data sharing policy in place for the location of the autonomous vehicle 106. The hashing of the vehicle-related identifiers or the user-related identifiers may protect the personal information of the user of the autonomous vehicle 106. Only an electronic device with a particular access level may configured to access the identification information using by use of the hash ID. In a scenario, one or more electronic devices (from the group of electronic devices) may be vetted by an authorized agency or may be assigned a higher access level on a need-to-know basis. In such a scenario, the identification information may be accessible to only such electronic devices.

At 508, a first data level of the plurality of data levels may be generated. In accordance with an embodiment, the processor 202 may be configured to generate the first data level of the plurality of data levels by encryption of a first data segment. The first data segment may include the first data partition of the plurality of data partitions and a first public key to validate the first data partition. The encryption of the first data segment may be based on an asymmetric encryption method, for example. The processor 202 may generate a first key pair, such as the first public key and a corresponding first private key. The first private key may be stored on electronic devices (of the group of electronic devices) which may be authorized to receive the first data level. By way of example, and not limitation, the first data partition may include information, such as a status of the traffic lighting system (which is the fourth electronic device 110D) and information associated with a speeding vehicle.

In one or more embodiments, the generated first data level may correspond to the first access level of the plurality of access levels. Each data level of the plurality of data levels may be generated according to an access level of a plurality of access levels and may include one or more data partitions of the plurality of data partitions in an encrypted form. For example, the first data level may be generated according to a first access level of the plurality of access levels and may include the first data partition. The access level may restrict an amount of information (from the public data) that should be provided to an electronic device (of the group of electronic devices) with the respective access level.

In some embodiments, the access level may be assigned to an electronic device based on a valid requirement, a defined importance metric, or rules/laws of the region where the electronic device operates. For example, the importance metric for the second electronic device 110B (which may be the smartphone associated with the person 112) may be lowest among the group of electronic devices. The importance metric for the first electronic device 110A and the fourth electronic device 110D (which may be a telemetry unit of another vehicle on road or the traffic lighting system, respectively) may be more than that of the second electronic device 110B. The importance metric for each of the third electronic device 110C (which may be a computer on the police vehicle), servers associated with a police station, servers of insurance companies, and servers/computers of the law enforcement agencies may be highest amongst all electronic devices in the group of electronic devices. An electronic device with a higher importance metric may imply that a higher access level or more amount of information (from the public data) may be available to the electronic device.

At 510, a second data level of the plurality of data levels may be generated by the encryption of a second data segment. The second data segment may include the second data partition of the plurality of data partitions, the encrypted first data segment (obtained at 508), and a second public key to validate the second data partition. The second data level may correspond to a second access level of the plurality of access levels and may include both the first data partition and the second data partition in encrypted form.

The processor 202 may generate a second key pair, such as the second public key and a corresponding second private key. The second private key and the first private key may be present with electronic devices (of the group of electronic devices) which may be authorized to receive the second data level. By way of example, and not limitation, the second data partition may include information, such as the location information of the autonomous vehicle 106, the location information related to any recorded accidents involving vehicles, and information related to traffic or pedestrians.

At 512, a third data level of the plurality of data levels may be generated by the encryption of a third data segment. The third data segment may include the third data partition of the plurality of data partitions, the encrypted second data segment (obtained at 510), and a third public key to validate the third data partition. The third data level may correspond to a third access level of the plurality of access levels and may include all the three data partitions of the public data.

The processor 202 may generate a third key pair, such as the third public key and a corresponding third private key. The third private key, the second private key, and the first private key may be present with electronic devices (of the group of electronic devices) which may be authorized to receive the third data level. By way of example, and not limitation, the third data partition may include information, such as the location information of the autonomous vehicle 106, the registration information of the owner of the autonomous vehicle 106, the location information related to any recorded accidents involving vehicles, and information related users (such as captured images) involved in the accident. The generated plurality of data levels may be transmitted to the group of electronic devices. Details of the transmission of the plurality of data levels are provided, for example, in FIG. 6.

Control passes to end. Although the flowchart 500 is illustrated as discrete operations, such as 502, 504, 506, 508, 510, and 512. However, in certain embodiments, such discrete operations may be further divided into additional operations, combined into fewer operations, or eliminated, depending on the particular implementation without detracting from the essence of the disclosed embodiments.

Figure 6:
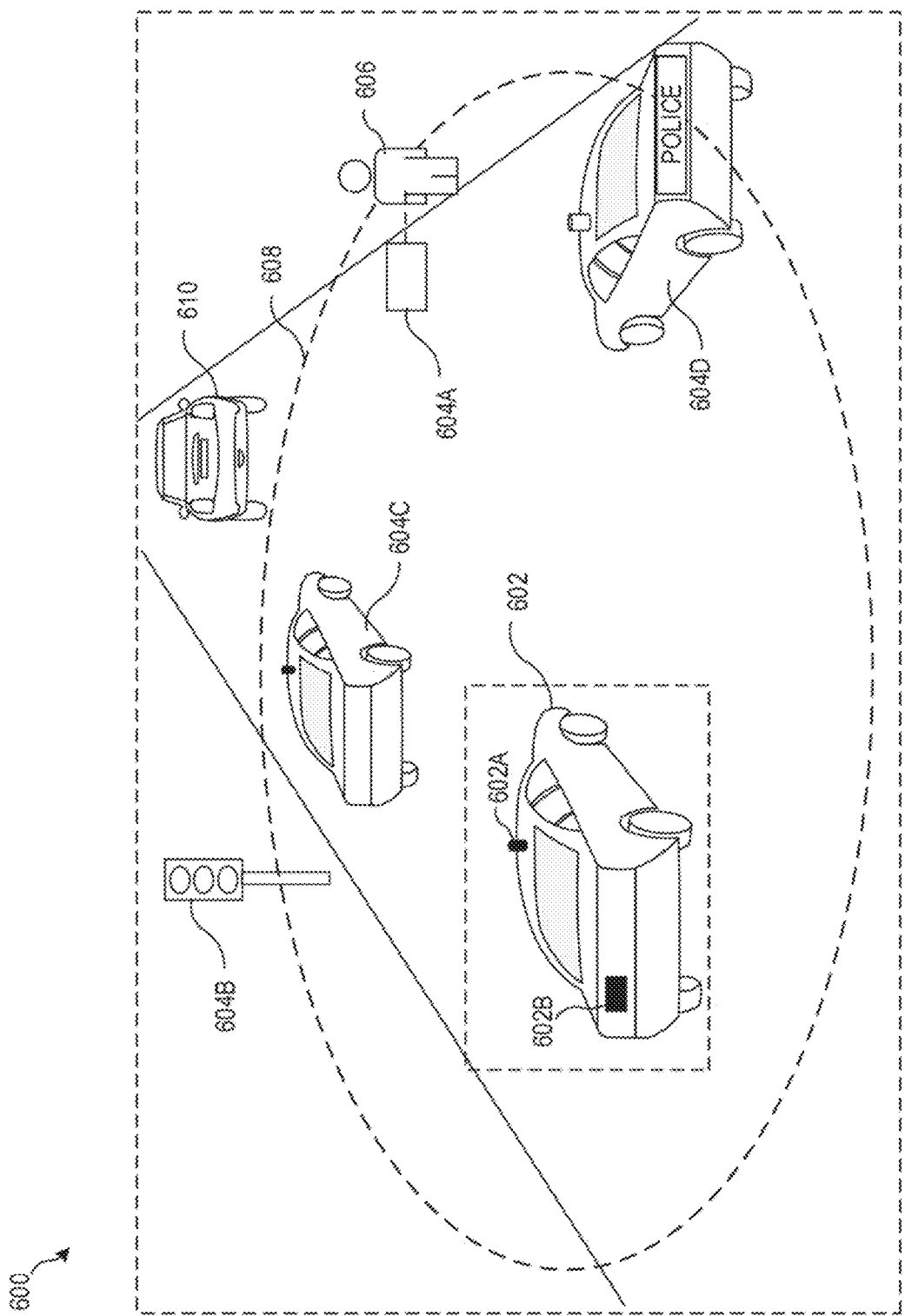
FIG. 6 is an exemplary scenario for broadcast of vehicle data to a group of electronic devices by an autonomous vehicle.

FIG. 6 is an exemplary scenario for broadcast of vehicle data to a group of electronic devices by an autonomous vehicle, according to at least one embodiment described in the present disclosure. FIG. 6 is explained in conjunction with elements from FIG. 1, FIG. 2, FIG. 3, FIG. 4, and FIG. 5. With reference to FIG. 6, there is shown a scenario 600. The scenario 600 may include an autonomous vehicle 602 and a group of electronic devices. The group of electronic devices includes a smartphone 604A associated with a pedestrian 606, a traffic lighting system 604B, a telemetry unit of a vehicle 604C, and a telemetry unit of a police vehicle 604D.

The autonomous vehicle 602 may be on a road, as shown in the scenario 600. The sensors, such as the first sensor 602A (for example, the LiDAR sensor) and the second sensor 602B (such as the RADAR sensor) may record data about the surroundings of the autonomous vehicle 602. In an embodiment, the number of sensors in the autonomous vehicle 602 may be more than two sensors (the first and the second sensors 602A and 602B). The surroundings of the autonomous vehicle 602 may include the pedestrian 606, the traffic lighting system 604B, the vehicle 604C, the police vehicle 604D, and a vehicle 610. The processor 202 may receive the vehicle data, which includes information associated with the first sensor 602A and the second sensor 602B. The processor 202 may segment the vehicle data into public data and non-public data (as described in FIG. 4, for example), and may partition the public data into a plurality of data partitions (as described in FIG. 5). Thereafter, the processor 202 may generate a plurality of data levels of the public data based on the plurality of data partitions (as described in FIG. 5).

The processor 202 may transmit (or broadcast) the generated plurality of data levels to the group of electronic devices. Each of electronic device of the group of electronic devices may retrieve, according to one of the plurality of access levels, at least a portion of the public data from the transmitted plurality of data levels. By way of example, and not limitation, each electronic device in the group of electronic devices may retrieve at least a portion of the public data by decrypting a received data level using a private key and validating the decrypted data level using the public key (included in the received data level). The retrieved portion of the public data may be useful for image processing, object detection, obstacle detection, pedestrian detection, and for improvement in safety and movement of pedestrians, vehicles, or other objects in the surrounding environment.

For example, the smartphone 604A may decrypt the first data level of the transmitted plurality of data levels, based on a first access level provided to the smartphone 604A. Similarly, the traffic lighting system 604B and the telemetry unit of the vehicle 604C may decrypt the second data level of the transmitted plurality of data levels, based on the second access level provided to the traffic lighting system 604B and the vehicle 604C. The telemetry unit or computer on the police vehicle 604D may decrypt the third data level of the transmitted plurality of data levels, based on the third access level provided to the police vehicle 604D.

In accordance with an embodiment, the processor 202 may be configured to authorize each of the group of electronic devices to access and retrieve at least the portion of the public data from the transmitted plurality of data levels, based on a location of the respective electronic device with respect to the autonomous vehicle 602. For example, the smartphone 604A may be authorized to access and decrypt the first data level of the transmitted plurality of data levels. Therefore, the authorized smartphone 604A may have the first private key stored therewith, to access and decrypt the first data level. The traffic lighting system 604B and the vehicle 604C may be authorized to access and decrypt the second data level of the transmitted plurality of data levels. Therefore, the authorized traffic lighting system 604B and the telemetry unit on the vehicle 604C may have the first private key and the second private key stored therewith, to access and decrypt the second data level. Similarly, the telemetry unit or computer on the police vehicle 604D may be authorized to access and decrypt the third data level of the transmitted plurality of data levels. Therefore, the telemetry unit or computer on the authorized police vehicle 604D may have the first private key, the second private key, and the third private key stored therewith, to access and decrypt the third data level.

In an exemplary implementation, the group of electronic devices may be registered to receive the plurality of data levels. For example, the group of electronic devices may register on a common server (such as a cloud based server or an internet-of-things (JOT) based server) associated with different automakers of the vehicles and servers related to different government agencies, to be able to receive the data levels and to retrieve at least a portion of the public data from the received data levels. In certain embodiments, the registered group of electronic devices may receive a respective private key (for example, a temporal key), each time the plurality of data levels is broadcasted.

In accordance with an embodiment, the plurality of data levels may be transmitted to the group of electronic devices based on a determination that each electronic device in the group of electronic devices is present within a threshold distance 608 of the autonomous vehicle 602. In an exemplary embodiment, the threshold distance 608 may be defined using a geo-fence or a radius (for example, around 500 meters) of a circle with the autonomous vehicle 602 at the center. The processor 202 may transmit the plurality of data levels to the group of electronic devices present within the threshold distance 608. As an example, the processor 202 may transmit the plurality of data levels to the smartphone 604A, the traffic lighting system 604B, the vehicle 604C, and the police vehicle 604D. The processor 202 may not transmit the plurality of data levels to the vehicle 610 as the vehicle 610 may be outside the geo-fence or the distance between vehicle 610 and the autonomous vehicle 602 may be greater than the threshold distance 608.

In accordance with an embodiment, the processor 202 may receive a validation request from a first electronic device of the group of electronic devices. The validation request may include the portion of the public data which may be retrieved by the first electronic device. For example, the first electronic device may be the telemetry unit or the computer on the police vehicle 604D. The telemetry unit or the computer on police vehicle 604D may transmit the validation request to the system 102 for validation of the retrieved portion (for example, a first data partition) of the public data. The processor 202 may match the portion of the public data in the validation request with an archived copy of a corresponding data partition of the plurality of data partitions.

In one or more embodiments, the archived copy of the corresponding data partition may be requested from the server associated with the automaker or the service provider of the autonomous vehicle 602. In some embodiments, the processor 202 may submit the validation request to the server to validate the retrieved portion of the public data. The archived copy of the corresponding data partition may be matched with the retrieved portion of the public data by comparing the archived copy of the data partition (which may include the archived copy of the hash ID and the data partition) and the retrieved portion (which may also include the hash ID and at least one data partition). Based on the match of the retrieved portion of the public data with the archived copy of the corresponding data partition, the retrieved portion of the public data in the validation request may be validated and the validation may be successful. In case the retrieved portion of the public data and the archived copy of the corresponding data partition do not match, the validation may fail. In both cases, validation information may be transmitted to the first electronic device, such as the telemetry unit or the computer on the police vehicle 604D. By receiving the validation information, the first electronic device may differentiate between broadcasted authentic information and broadcasted false information.

Figure 7:
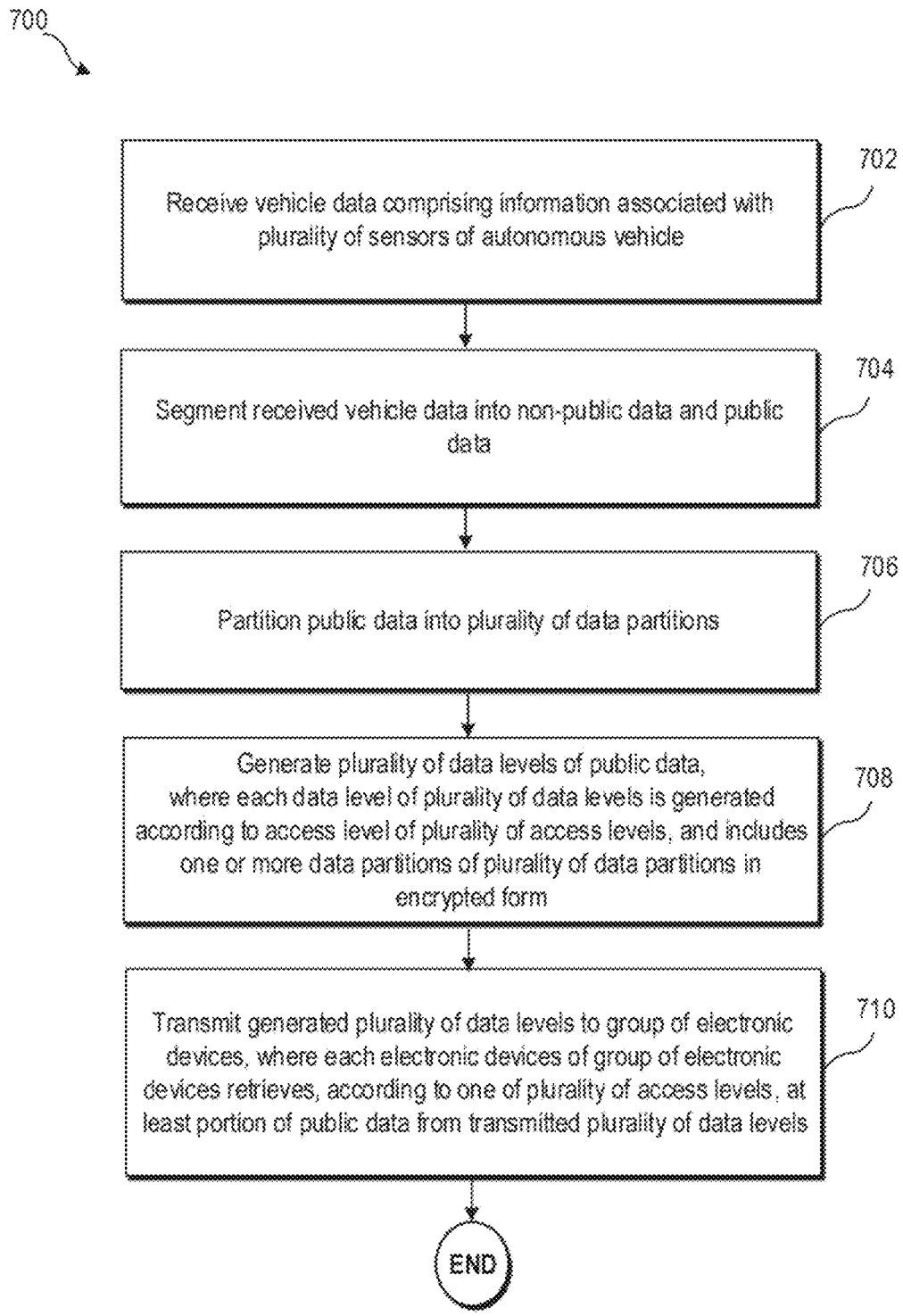
FIG. 7 illustrates a flowchart of an example method related to broadcasting vehicle data with the group of electronic devices by the autonomous vehicle of FIG. 1.

FIG. 7 illustrates a flowchart of an example method related to broadcasting vehicle data with a group of electronic devices by the autonomous vehicle of FIG. 1, according to at least one embodiment described in the present disclosure. FIG. 7 is explained in conjunction with elements from FIG. 1, FIG. 2, FIG. 3, FIG. 4, FIG. 5 and FIG. 6. With reference to FIG. 7, there is shown a flowchart 700. The method illustrated in the flowchart 700 may start at 702 and may be performed by any suitable system, apparatus, or device, such as by the example system 102 of FIG. 1 or the processor 202 of FIG. 2. Although illustrated with discrete blocks, the steps and operations associated with one or more of the blocks of the method may be divided into additional blocks, combined into fewer blocks, or eliminated, depending on the particular implementation.

At 702, the vehicle data, including information associated with the plurality of sensors 306 of the autonomous vehicle 106 may be received. In accordance with an embodiment, the processor 202 may be configured to receive the vehicle data comprising information associated with the plurality of sensors 306 of the autonomous vehicle 106. In some embodiments, the received vehicle data may further include the location information associated with the autonomous vehicle 106, the vehicle-related identifiers associated with the autonomous vehicle 106, and the user-related identifiers associated with the autonomous vehicle 106. Details of the reception of the vehicle data are provided for example, in FIG. 4 (at 402).

At 704, the received vehicle data may be segmented into the non-public data and the public data. In accordance with an embodiment, the processor 202 may be configured to segment the received vehicle data into the non-public data and the public data. In some embodiments, the received vehicle data may include the plurality of objects, each of which may be formatted as the key-value pair. The processor 202 may segment the vehicle data based on the public data schema and the private data schema. Details of the segmentation of the vehicle data are provided for example, in FIG. 4.

At 706, the public data may be partitioned into the plurality of data partitions. In accordance with an embodiment, the processor 202 may be configured to partition the public data into the plurality of data partitions. In some embodiments, the processor 202 may de-identify the plurality of data partitions of the public data by hashing the vehicle-related identifiers or the user-related identifiers included in the plurality of data partitions. Details of the are partition of the public data are provided for example, in FIG. 5 (at 504).

At 708, the plurality of data levels of the public data may be generated. In accordance with an embodiment, the processor 202 may be configured to generate the plurality of data levels of the public data. Each data level of the plurality of data levels may be generated according to the access level of the plurality of access levels and may include one or more data partitions of the plurality of data partitions in the encrypted form. Details of the generation of the plurality of data levels are provided for example, in FIG. 5.

At 710, the generated plurality of data levels may be transmitted to the group of electronic devices. In accordance with an embodiment, the processor 202 may be configured to transmit the generated plurality of data levels the group of electronic devices. Each electronic device of the group of electronic devices may retrieve, according to one of the plurality of access levels, at least the portion of the public data from the transmitted plurality of data levels. Details of the transmission of the plurality of data levels are provided for example, in FIG. 6.

Control passes to end. Although the flowchart 700 is illustrated as discrete operations, such as 702, 704, 706, 708 and 710. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as the example system 102) to perform operations. The operations may include receiving vehicle data comprising information associated with a plurality of sensors (such as the plurality of sensors 306) of an autonomous vehicle (such as the autonomous vehicle 106). The operations may further include segmenting the received vehicle data into non-public data and public data. The operations may further include partitioning the public data into a plurality of data partitions. The operations may further include generating a plurality of data levels of the public data. Each data level of the plurality of data levels may be generated according to an access level of a plurality of access levels and may include one or more data partitions of the plurality of data partitions in an encrypted form. The operations may further include transmitting the generated plurality of data levels to a group of electronic devices (such as the first electronic device 110A, the second electronic device 110B, the third electronic device 110C and the fourth electronic device 110D). Each electronic device of the group of electronic devices may retrieve, according to one of the plurality of access levels, at least a portion of the public data from the transmitted plurality of data levels.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
receiving vehicle data comprising information associated with one or more sensors of an autonomous vehicle;
segmenting the received vehicle data into non-public data and public data;
partitioning the public data into a plurality of data partitions;
generating a plurality of data levels of the public data, wherein each data level of the plurality of data levels is generated according to an access level of a plurality of access levels, and includes one or more data partitions of the plurality of data partitions in an encrypted form; and
transmitting the generated plurality of data levels to a group of electronic devices,
wherein each electronic device of the group of electronic devices retrieves, according to one of the plurality of access levels, at least a portion of the public data from the transmitted plurality of data levels.

2. The method according to claim 1, wherein the received vehicle data further comprises location information associated with the autonomous vehicle, vehicle-related identifiers associated with the autonomous vehicle, and user-related identifiers associated with the autonomous vehicle.

3. The method according to claim 1, wherein the information associated with the one or more sensors comprises sensor measurements, and decision and inference information associated with a post-processing of the sensor measurements on the autonomous vehicle or on one or more electronic devices, which are separate from the autonomous vehicle and are managed by one or more service providers associated with the autonomous vehicle.

4. The method according to claim 1, wherein
the received vehicle data includes a plurality of objects, each of which is formatted as a key-value pair, and
the segmentation of the vehicle data is based on a public data schema and a private data schema.

5. The method according to claim 4, wherein the segmenting further comprises:
selecting an object of the plurality of objects;
searching the selected object in each of the private data schema and the public data schema; and
including the searched object in the public data based on a determination that the searched object is found in the public data schema.

6. The method according to claim 1, further comprising de-identifying the plurality of data partitions of the public data by hashing vehicle-related identifiers or user-related identifiers included in the plurality of data partitions.

7. The method according to claim 6, further comprising generating, after the de-identification, a first data level of the plurality of data levels by the encrypting a first data segment which includes:
a first data partition of the plurality of data partitions, and
a first public key to validate the first data partition,
wherein the first data level corresponds to a first access level of the plurality of access levels.

8. The method according to claim 7, further comprising generating a second data level of the plurality of data levels by the encrypting a second data segment which includes:
a second data partition of the plurality of data partitions,
the encrypted first data segment, and
a second public key to validate the second data partition,
wherein the second data level corresponds to a second access level of the plurality of access levels.

9. The method according to claim 8, further comprising generating a third data level of the plurality of data levels by the encrypting a third data segment which includes:
a third data partition of the plurality of data partitions,
the encrypted second data segment, and
a third public key to validate the third data partition,
wherein the third data level corresponds to a third access level of the plurality of access levels.

10. The method according to claim 1, further comprising authorizing each of the group of electronic devices to access and retrieve at least the portion of the public data from the transmitted plurality of data levels, based on a location of the respective electronic device with respect to the autonomous vehicle.

11. The method according to claim 1, wherein the plurality of data levels is transmitted to the group of electronic devices based on a determination that each electronic device in the group of electronic devices is present within a threshold distance of the autonomous vehicle.

12. The method according to claim 1, further comprising:
receiving a validation request from a first electronic device of the group of electronic devices, wherein the validation request includes the portion of the public data which is retrieved by the first electronic device;
matching the portion of the public data that is included in the validation request with an archived copy of a corresponding data partition of the plurality of data partitions; and
validating the portion of the public data that is included in the validation request based on the match.

13. The method according to claim 1,
wherein each of the group of electronic devices is associated with one of an Information Technology (IT) service provider for the autonomous vehicle, an automaker of the autonomous vehicle, an owner or a user of the autonomous vehicle, a vehicle different from the autonomous vehicle, a government or law enforcement agency, a public transport infrastructure, or a data aggregator, and
the group of electronic devices comprises a traffic lighting system, a traffic camera, a roadside unit, a mobile device, a cloud server, an edge device, a mobile digital terminal in a law enforcement vehicle, a telecom equipment, or an electronic control unit (ECU) of the vehicle which is within a threshold distance from the autonomous vehicle.

14. A non-transitory computer-readable storage medium configured to store instructions that, in response to being executed, causes a system to perform operations, the operations comprising:
receiving vehicle data comprising information associated with one or more sensors of an autonomous vehicle;
segmenting the received vehicle data into non-public data and public data;
partitioning the public data into a plurality of data partitions;
generating a plurality of data levels of the public data,
wherein each data level of the plurality of data levels is generated according to an access level of a plurality of access levels, and includes one or more data partitions of the plurality of data partitions in an encrypted form; and
transmitting the generated plurality of data levels to a group of electronic devices,
wherein each electronic device of the group of electronic devices retrieves, according to one of the plurality of access levels, at least a portion of the public data from the transmitted plurality of data levels.

15. The non-transitory computer-readable storage medium according to claim 14, wherein the information associated with the one or more sensors comprises sensor measurements, and decision and inference information associated with a post-processing of the sensor measurements on the autonomous vehicle or on one or more electronic devices, which are separate from the autonomous vehicle and are managed by one or more service providers associated with the autonomous vehicle.

16. The non-transitory computer-readable storage medium according to claim 14, wherein the operations further comprise de-identifying the plurality of data partitions of the public data by hashing vehicle-related identifiers or user-related identifiers included in the plurality of data partitions.

17. The non-transitory computer-readable storage medium according to claim 16, wherein the operations further comprise generating, after the de-identification, a first data level of the plurality of data levels by the encrypting a first data segment which includes:
a first data partition of the plurality of data partitions, and
a first public key to validate the first data partition,
wherein the first data level corresponds to a first access level of the plurality of access levels.

18. The non-transitory computer-readable storage medium according to claim 17, wherein the operations further comprise generating a second data level of the plurality of data levels by the encrypting a second data segment which includes:
a second data partition of the plurality of data partitions,
the encrypted first data segment, and
a second public key to validate the second data partition,
wherein the second data level corresponds to a second access level of the plurality of access levels.

19. The non-transitory computer-readable storage medium according to claim 18, wherein the operations further comprise generating a third data level of the plurality of data levels by the encrypting a third data segment which includes:
a third data partition of the plurality of data partitions,
the encrypted second data segment, and
a third public key to validate the third data partition,
wherein the third data level corresponds to a third access level of the plurality of access levels.

20. A system, comprising:
a processor configured to:
receive vehicle data comprising information associated with one or more sensors of an autonomous vehicle;
segment the received vehicle data into non-public data and public data;
partition the public data into a plurality of data partitions;
generate a plurality of data levels of the public data,
wherein each data level of the plurality of data levels is generated according to an access level of a plurality of access levels, and includes one or more data partitions of the plurality of data partitions in an encrypted form; and
transmit the generated plurality of data levels to a group of electronic devices,
wherein each electronic device of the group of electronic devices retrieves, according to one of the plurality of access levels, at least a portion of the public data from the transmitted plurality of data levels.

* * * * *